United States Patent [19]
Fletcher et al.

[11] Patent Number: 6,032,175
[45] Date of Patent: Feb. 29, 2000

[54] ENHANCED DIRECTORY SERVICES IN COMPOUND WIDE/LOCAL AREA NETWORKS

[75] Inventors: James Corvin Fletcher, Cary; Marcia Lambert Peters, Raleigh, both of N.C.; John Hoon Shin, Austin, Tex.

[73] Assignee: International Business Machines Corporation, Armonk, N.Y.

[21] Appl. No.: 08/731,718

[22] Filed: Oct. 17, 1996

[51] Int. Cl.[7] .................................................. G06F 11/00
[52] U.S. Cl. ....................... 709/200; 370/110.1
[58] Field of Search ............... 395/200, 200.02, 395/200.13, 831, 650; 709/200; 370/110.1, 60.1

[56] References Cited

U.S. PATENT DOCUMENTS

| | | | |
|---|---|---|---|
| 4,688,035 | 8/1987 | Gray et al. | 340/825.52 |
| 4,914,571 | 4/1990 | Baratz et al. | 364/200 |
| 5,109,483 | 4/1992 | Baratz et al. | 395/200 |
| 5,191,650 | 3/1993 | Kramer et al. | 395/200 |
| 5,224,205 | 6/1993 | Dinkin et al. | 395/200 |
| 5,233,604 | 8/1993 | Ahmadi et al. | 370/60 |
| 5,303,235 | 4/1994 | Chan et al. | 370/60.1 |
| 5,335,229 | 8/1994 | Hunt et al. | 370/110.1 |
| 5,537,547 | 7/1996 | Chan et al. | 709/200 |
| 5,539,881 | 7/1996 | Hunt et al. | 709/200 |
| 5,557,798 | 9/1996 | Skeen et al. | 395/650 |
| 5,594,921 | 1/1997 | Pettus | 395/831 |
| 5,715,395 | 2/1998 | Brabson et al. | 395/200.13 |
| 5,745,680 | 4/1998 | Brooks et al. | 395/200.02 |

OTHER PUBLICATIONS

Michael O.Allen, SNA Management Services Architecture for APPN Architecture, Jul. 4, 1992.
Steven T.Joyce, APPN, An Overview, Jan. 5, 1993.
RonSanders, Proposal for the Enhancement of APPN Directory Services to SUpport Resource Types Other than LUs, Aug. 1, 1995.
"Advances in APPN Architecture," R. Bird et al., *IBM Systems Journal*, vol. 4, No. 8, pp. 430–451, 1995.

*Primary Examiner*—Frank J. Asta
*Assistant Examiner*—Thong Vu
*Attorney, Agent, or Firm*—Jeanine S. Ray-Yarletts; Marcia L. Doubet

[57] ABSTRACT

Enhanced directory services for large and complex compound WAN/LAN networks includes the use of resource triplet identifications including the resource identification, the identification of the domain in which the resource resides, and the identification of the access node connecting the resource to the compound network. The creation and storage of these identification triplets are automatically initiated as new resources are added to the compound network. Features include the deliberate corruption or modification of triplet identifications to allow prior art directory services to access resources in foreign networks, and the use of these corrupted vectors (as well as the contents of the WAN network topology data base) to allow route selection regardless of the size or complexity of the WAN/LAN network.

26 Claims, 7 Drawing Sheets

COMPOUND WIDE AREA, LOCAL AREA NETWORK

COMPOUND WIDE AREA, LOCAL AREA NETWORK

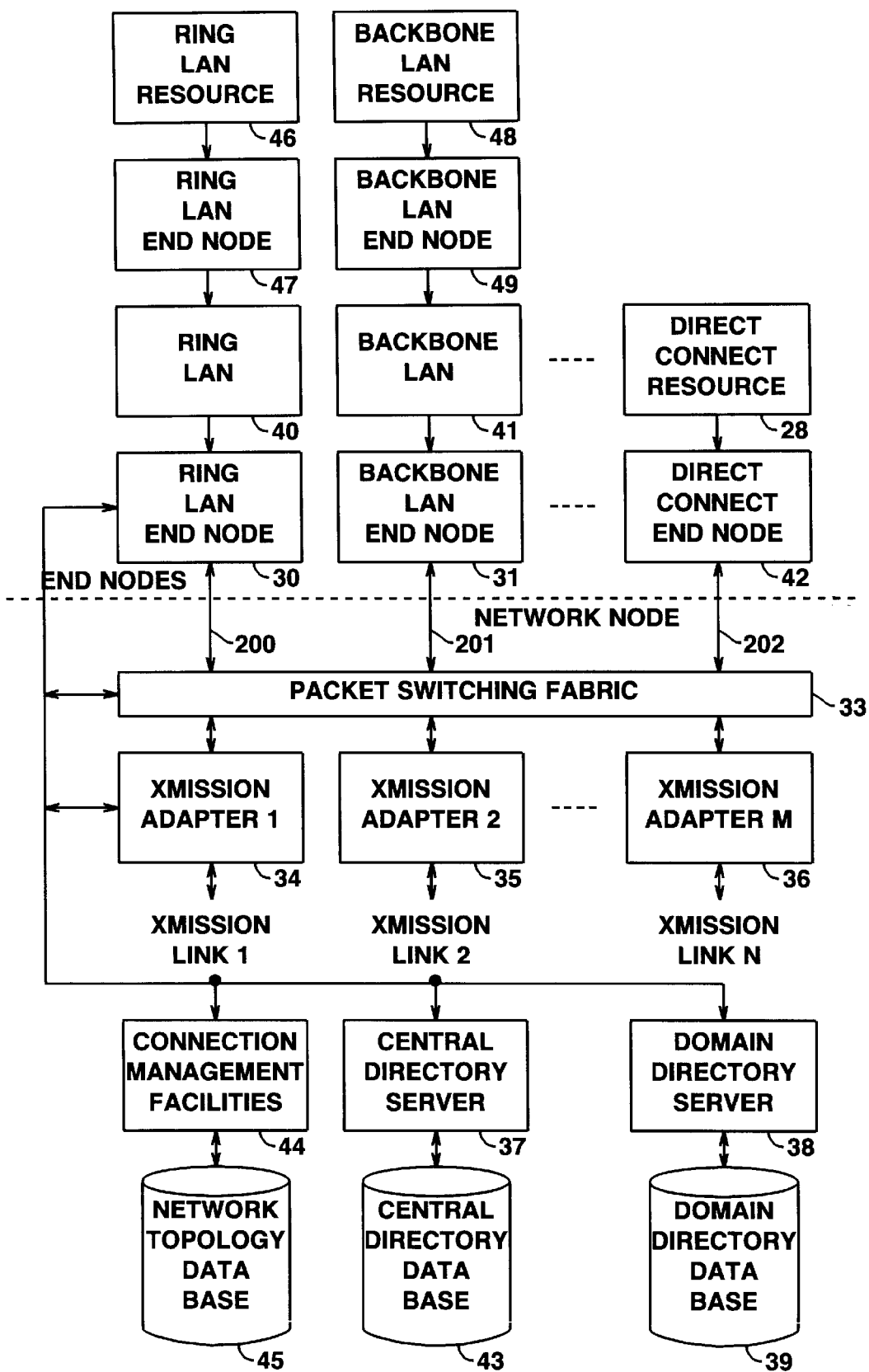

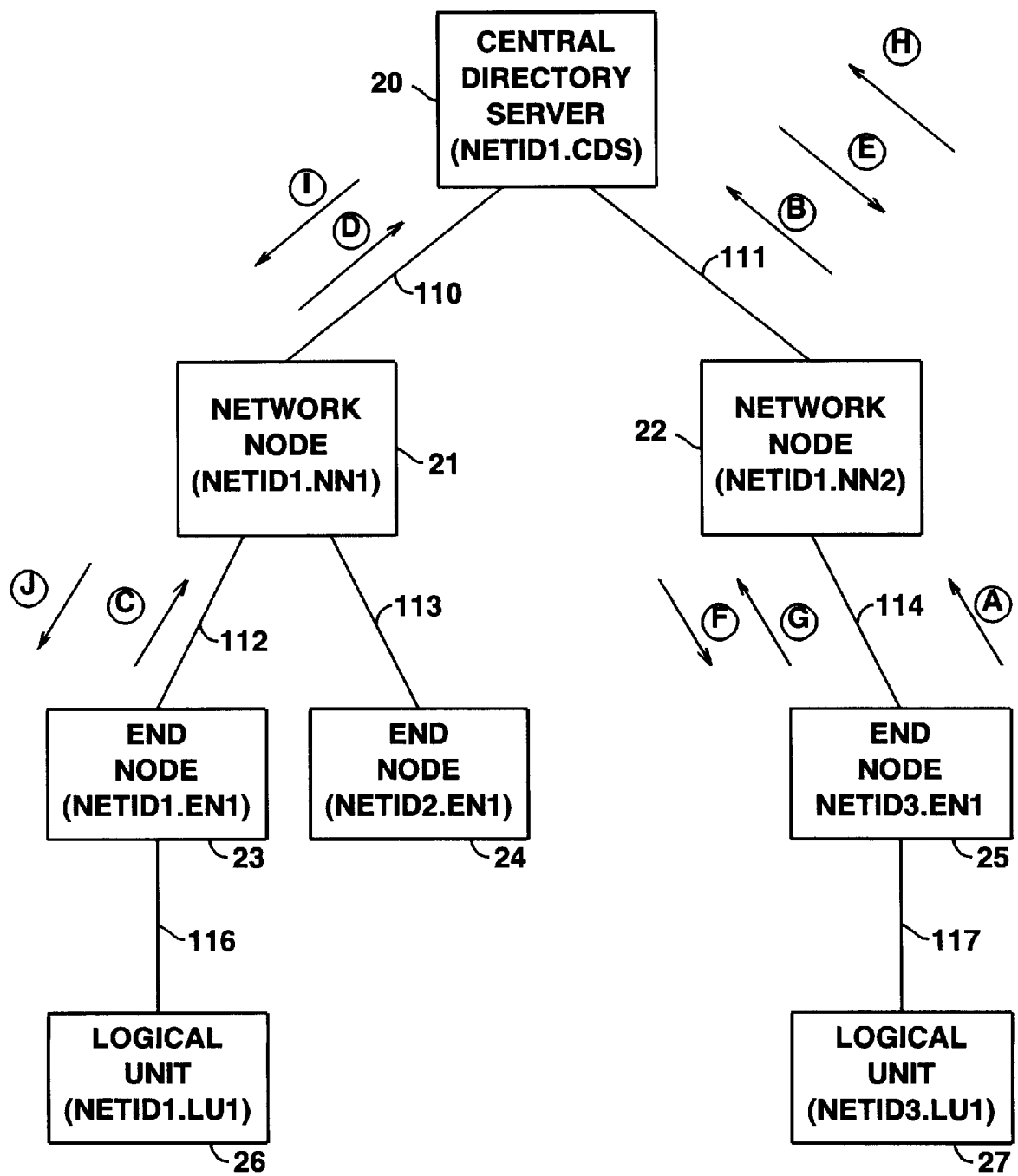

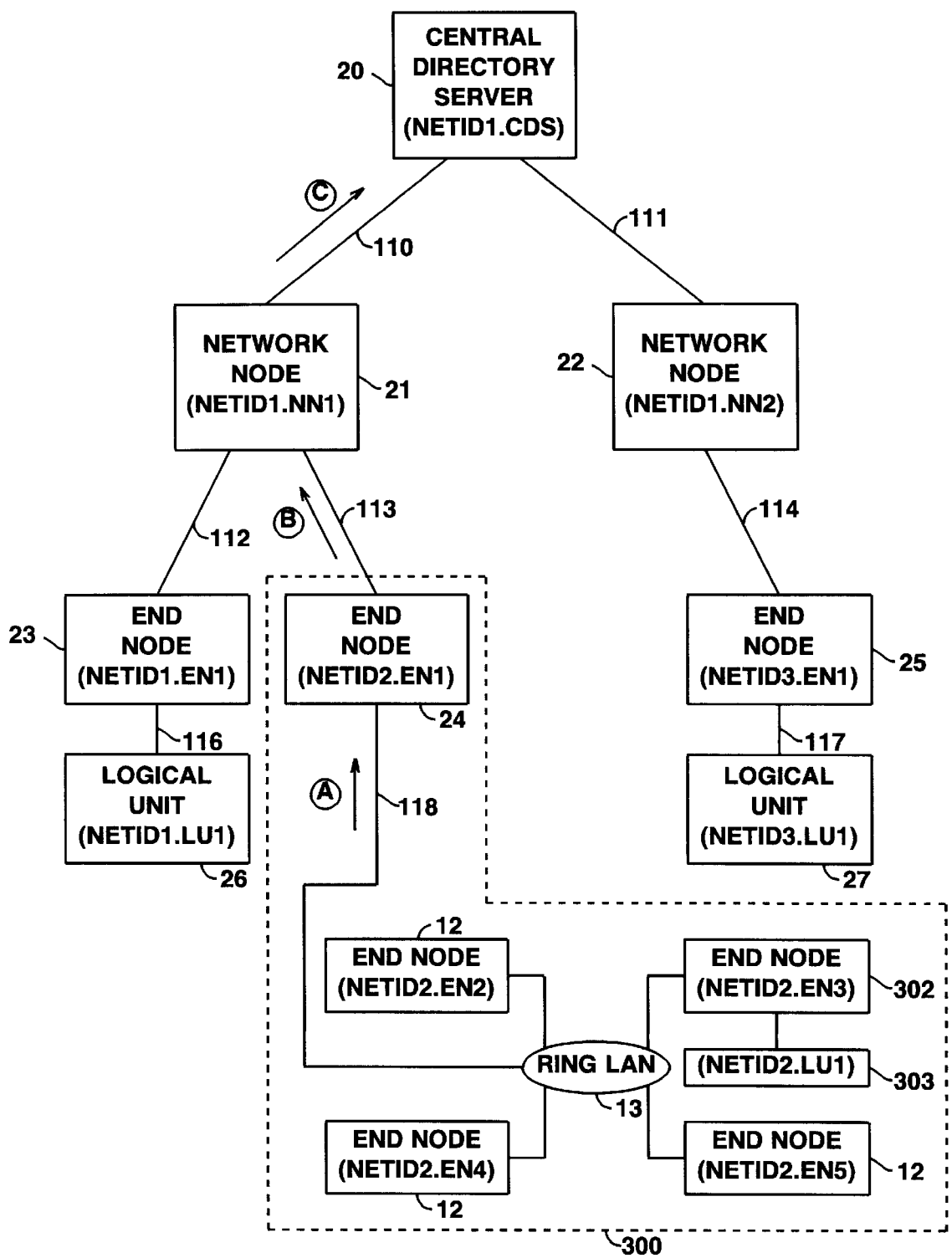

FIG. 4
GENERIC DATA STREAM (GDS) VARIABLE
GENERIC GDS CONTROL VECTOR
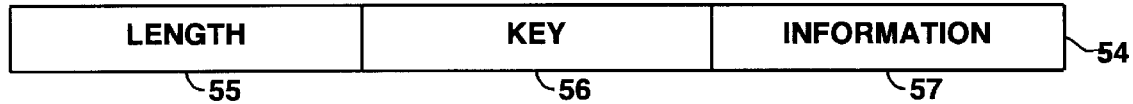
FIG. 5
RESOURCE IDENTIFIER TRIPLET
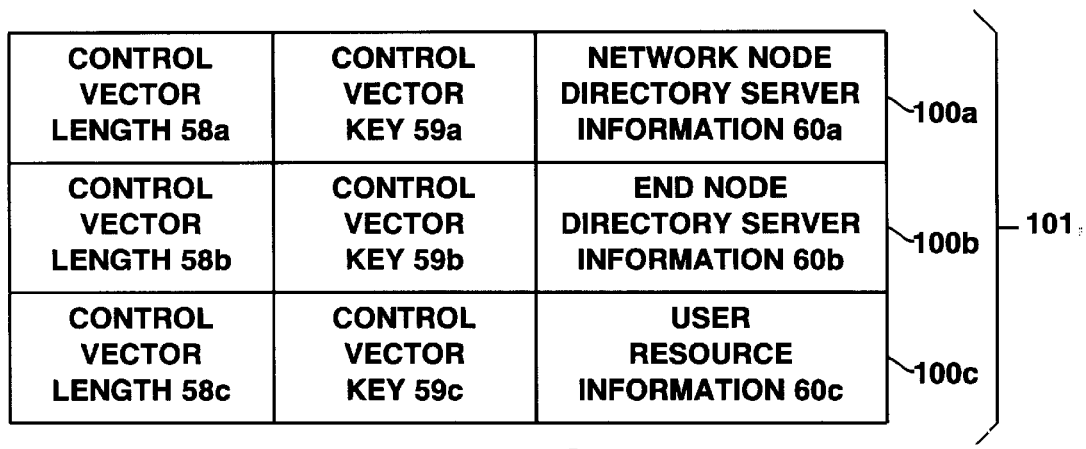
FIG. 6
GDS RESOURCE REGISTRATION MESSAGES
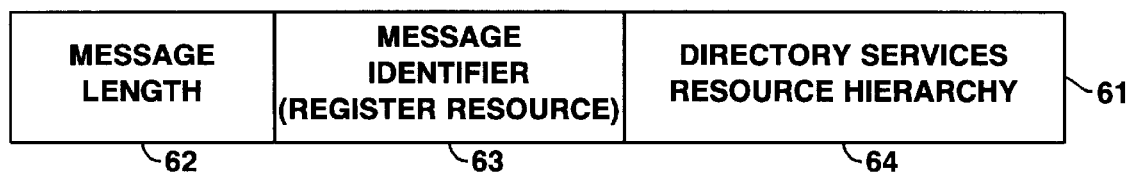
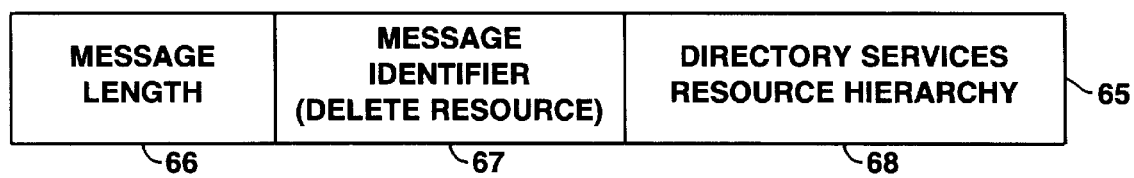
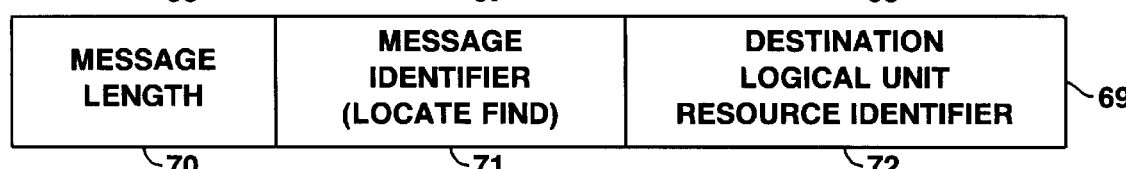
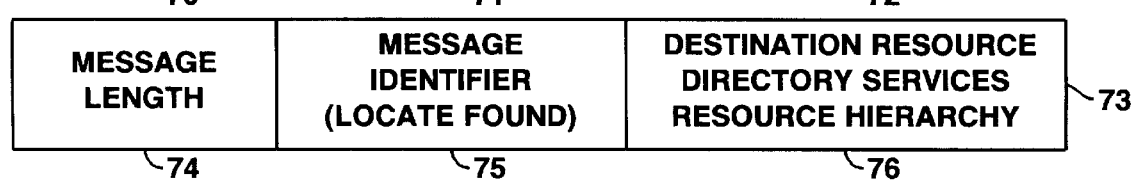

CROSS SUBNETWORK RESOURCE REGISTRATION

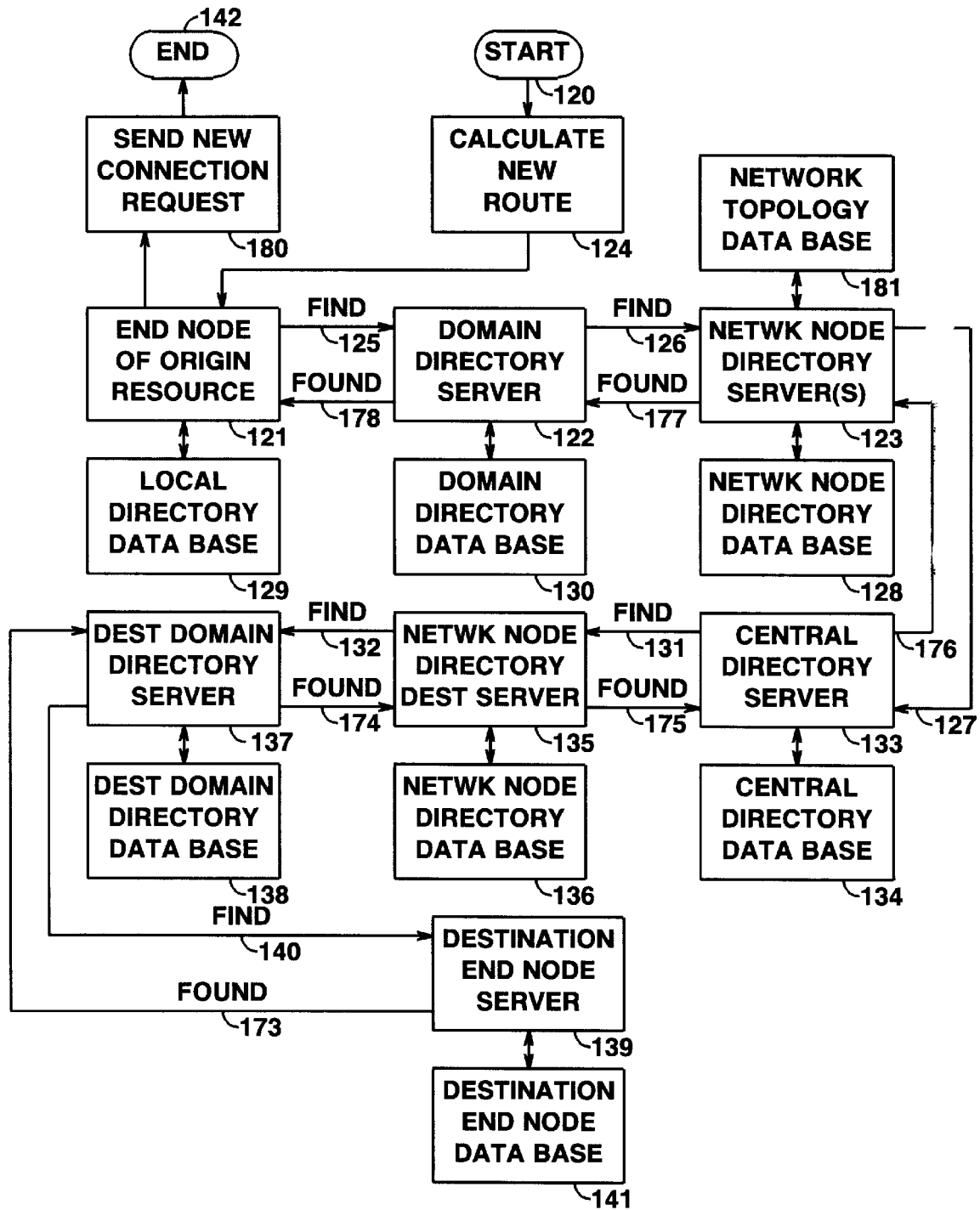

ENHANCED DIRECTORY SERVICES IN COMPOUND WIDE/LOCAL AREA NETWORKS

TECHNICAL FIELD

This invention relates to enhanced central directory services in Wide Area Networks (WANs) and, more particularly, to the registration of user resources residing on nodes, possibly themselves interconnected by Local Area Networks (LANs), in such WANs, across boundaries between logical partitions or topology domains of the WAN.

BACKGROUND OF THE INVENTION

Distributed directory services for computer networks are disclosed in A. E. Baratz et al. U.S. Pat. No. 4,914,571, granted Apr. 3, 1990. Resource identifications in the Baratz patent, however, are stored only by the network nodes (a network node being the node in a domain to which all that domain's end nodes are connected). As a result, the directory data base is generally limited to a very small proportion of all of the resources in the network. This limitation greatly increases the number of broadcast searches needed to create routes in the network, i.e., all cross-domain searches must be initially broadcast. Thereafter remote resource data is cached in the network node initiating the search.

The directory services of the Baratz patent can be further enhanced by the central directory server disclosed in "Advances in APPN Architecture," by R. Bird et al., *IBM Systems Journal*, Vol. 4, No. 3, pages 430–451 (1995). Before conducting broadcast searches, Bird's network nodes consult a central directory server, which may have a larger storage and hold entries for more resources. The total number of directory broadcasts in the logical partition of a network served by one such central directory server is thereby reduced from n×m, where n is the number of network nodes and m is the number of resources, to m. That is, only the central directory need conduct broadcast searches, and resource information obtained on behalf of one network node may later be supplied to satisfy a different network node's query. While the Bird technique does reduce the number of broadcast searches, it does not eliminate such broadcast searches.

It has become increasingly common to use Wide Area Networks to interconnect large numbers of Local Area Networks (LANs). It is difficult, however, to provide resource directory services in such compound networks because the LAN resources often pre-exist the interconnecting WAN and hence are not constrained to utilize LAN resource identifications which are necessarily different from the previously assigned WAN resource identifications. In addition, the size of topology data bases used to control interconnections in the WAN are normally chosen to reflect the number of nodes and links in the WAN network. Typically, these topology data bases are therefore often too small to contain all of the possibly non-unique identification information about all of the LAN resources which are connected to that WAN. This forces a very serious limitation on the maximum size to which such compound WAN/LAN networks can grow. Indeed, network users would prefer internal interconnection services with no limit on ultimate size. To overcome these perceived limitations, users tend to partition WANs into separate topology domains, each of which may have its own central directory server(s), that can provide directory services only within that topological domain. In such a scheme, a unique high-level qualifier, called the "NETID," precedes the resource identifier for all network nodes and most end user resources within the same topological domain Providing unique resource identifications across the set of interconnected topological domains despite these pre-existing resource naming conventions is difficult. For example, for flexibility such naming schemes may permit end nodes to attach to topological domains with NETIDs different than their own, since an end node might well access multiple networks through dial-up transmission facilities.

This searching problem is exacerbated when the WAN takes the form of an Advanced Peer-to-Peer Networking (APPN®) network. APPN networks offer a powerful, flexible and easy-to-use networking solution for client/server and distributed applications. Such applications create many additional directory service problems, however, when attempting to use APPN for very large networks interconnecting large pluralities of LANs. The large number of APPN network nodes, and corresponding network node identifications, in such large APPN networks, creates even more serious searching problems across the APPN network.

Finally, existing limitations on the size of the available WAN topology data bases often make it difficult to select routes on the basis of class of service (requiring quality of service information in the data base). Customers would, of course, like to interconnect very large numbers of small LANs as gateways to the customer's branch offices. Each branch site, however, is usually itself configured as a LAN, thereby effectively doubling the possible number of topology data base entries. All of these constraints combine to render the provision of efficient directory services across such a large compound WAN/LAN network, whether or not an APPN network, difficult if not impossible.

SUMMARY OF THE INVENTION

In accordance with the illustrative embodiment of the present invention, enhanced directory services are provided in large, unconstrained, compound Wide Area/Local Area Networks by a hierarchical, automatically initiated directory registration process for all new resources added to a network at the time those new resources are initially added to the network. Such a central directory is designed to contain information about all resources in and connected to the WAN/LAN network. To support this registration activity, a central directory services server, together with a large central directory data base, is made available in one of the WAN network nodes. The size of the central directory data base used to store resource information can be made responsive to user requests, and hence be of any size necessary to support routing between any two resources in the compound network and still include Quality of Service parameters.

More particularly, each Local Area Network connected to the Wide Area Network is connected to the WAN through a WAN network node and, together with the connected WAN network node, forms a "resource domain" within which resources can be uniquely identified by identifying the network node domain in which they appear (as well as the resource end node and the resource itself). In order to increase the efficiency in the processing of such identifications, the domain network node identification is added to the end node user resource identifications to form a triplet. This triplet includes the identification of the resource itself, the identification of the domain in which the resource resides, and the identification of the domain network node in which the triplet resource itself resides. This triplet is always necessarily unique in the compound Wide Area Network.

In accordance with one feature of the present invention, as each new end node resource is added to a domain, a triplet resource identification is created, one member of the triplet at a time, by register resource messages initiated automatically at the end node resource, traveling to the domain network node and thence to the central resource directory. This process, called resource registration, takes advantage of the domain network node by including a domain level data base containing a comprehensive set of triplet resource identifications including all of the end node resources "owned" by that domain network node. This feature allows the fastest possible retrieval of an identification by a local end node which can be obtained by referral to the directly connected domain network node without requiring the locate function to be sent on to the central directory data base. The central directory data base, of course, contains the triplet identifications of all of resources connected to the entire compound network. The route calculation algorithms of the WAN network can then retrieve the triplet resource identifications from the central directory data base and use them to calculate optimum routes, using Quality of Service (QoS) criteria if desired. Again, if all of the necessary resource information can be retrieved from a domain or end node storage facility closer to the requester than the central directory, the search is taken only to the closest available source of the information, be it the domain directory or the end node resource itself.

Since network retrofitting is time-consuming and expensive, the enhanced directory services of the present invention have been made compatible with existing network management programming (so as not to require network changes). For example, and in accordance with a final feature of the present invention, during the initial automatic registration activity the triplet resource identification being registered is deliberately corrupted in the domain resource data base by substituting one owning end node identifier for another in that data base. This substitution serves to conceal the true nature of the domain data base server from the balance of the network and thus forces the WAN network to treat the domain node as if it were a single end node. This allows standard search, locate and register messages to be sent on to the central directory without changing the existing network software.

BRIEF DESCRIPTION OF THE DRAWINGS

A complete understanding of the present invention may be gained by considering the following detailed description in conjunction with the accompanying drawings, in which:

FIG. 2 shows a more detailed block diagram of generic network node in the network of FIG. 1, illustrating the types of equipment which may be present in various network nodes of the network of FIG. 1, and which equipment is useful to implement the enhanced directory services in accordance with the present invention;

FIG. 3A shows a graphical and functional representation of the prior art central resource registration processes which might typically take place in prior art networks similar to that of FIG. 1;

FIG. 3B shows a graphical and functional representation of the enhanced central resource registration processes available in a network such as that shown in FIG. 1, using the equipment shown in FIG. 2, in accordance with the present invention;

FIG. 4 shows graphical representations of prior art generic Generalized Data Stream (GDS) variable data format structures including, at the top of the figure, a Generalized Data Stream (GDS) representation of the generic GDS format and, at the bottom of the figure, a generic GDS representation of a typical GDS control vector;

FIG. 5 is a graphical representation of the GDS triplet directory services resource hierarchy identifications coded as three control vectors such as those illustrated in the bottom format of FIG. 4 and which can be used in the enhanced directory services messages in accordance with the present invention;

FIG. 6 is a graphical representation of directory services GDS variables used in the major enhanced directory services provided in accordance with the present invention;

FIG. 8 shows a flow chart of the process of searching for resource identifications previously registered in the central directory, forming part of the enhanced directory services in accordance with the present invention.

To facilitate reader understanding, identical reference numerals are used to designate elements common to the figures.

DETAILED DESCRIPTION

Figure 1:
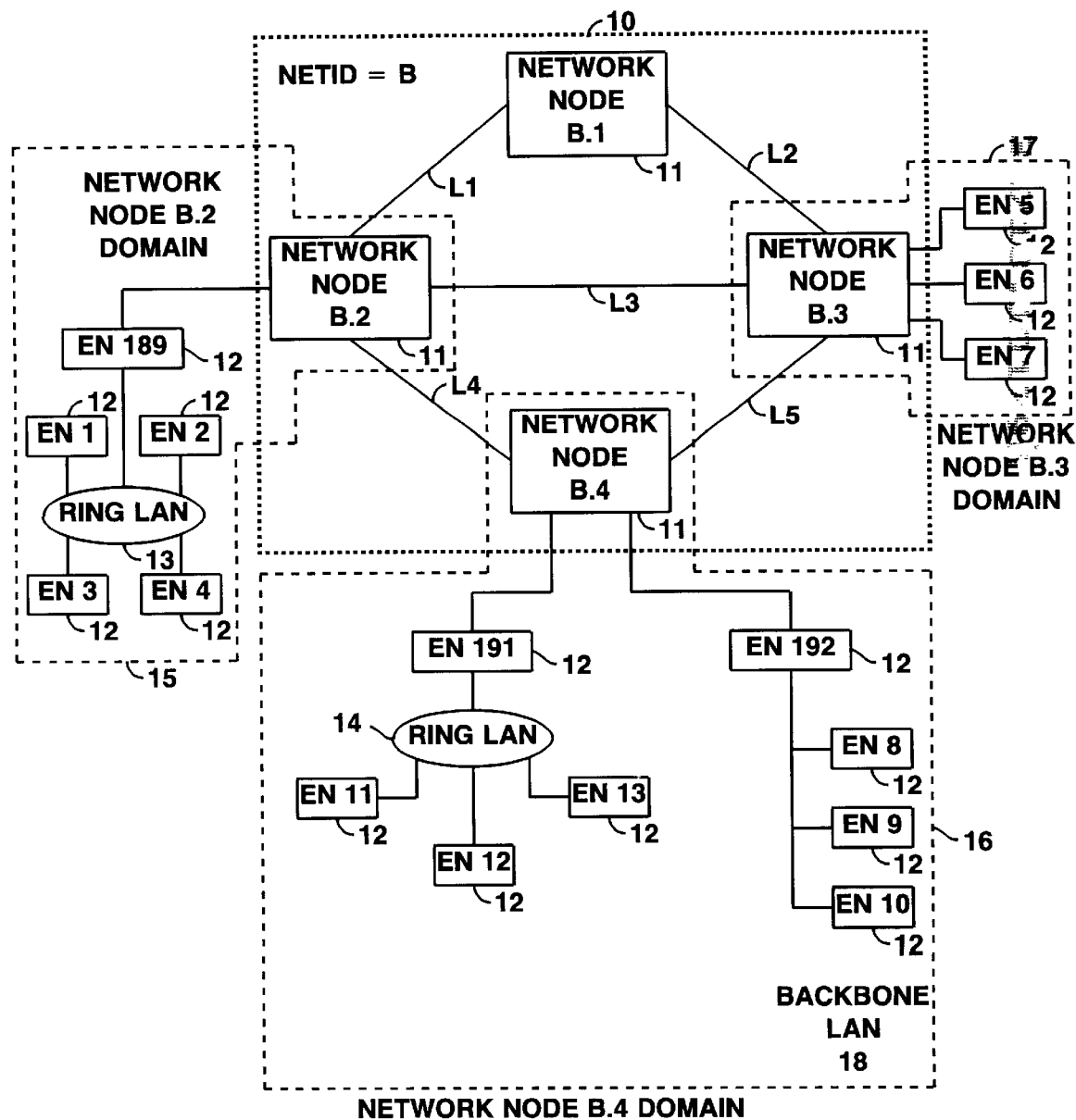
FIG. 1 shows a general block diagram of a compound Wide Area/Local Area network in which enhanced directory services might be provided in accordance with the present invention.

Referring more particularly to FIG. 1, there is shown a general block diagram of what may be called a compound Wide Area Network (WAN)-Local Area Network (LAN) 10 comprising four network nodes 11, each with a unique resource identifier, i.e., B.1, B.2, B.3 and B.4, respectively. Network nodes 11 are interconnected by five interconnecting transmission links labeled L1, L2, L3, L4 and L5, respectively. Network nodes 11 and transmission links L1–5 are merely illustrative of the numerous nodes and links that might form part of a real network 10. Indeed, network 10 can easily be transcontinental or even intercontinental and involve hundreds or even thousands of nodes and links.

The network nodes 11 can each, in turn, be used to attach or interconnect users, even foreign network users, to the network 10. Such interconnections can be made directly, such as end nodes (ENs) 5, 6 and 7, connected to network node B.3, or interconnected by way of Local Area Networks (LANs). Network node B.2, for example, is connected through end node EN 189 to a ring LAN 13 and thence to end nodes 1–4. Network node B.4 is connected through end node EN 191 to a ring LAN 14 and thence to end nodes 11–13, and through end node EN 192, to a "backbone" LAN 18 (such as ETHERNET®) and thence to end nodes 8–10. End nodes 12 are merely illustrative of the hundreds or thousands of end nodes which are used to connect user resources to network 10, and which can each be connected to a LAN or user resource. Such resources include Logical Units (LUs), application programs, Point-of-Sale terminals, computers, printers, facsimile machines, file servers and all of the other network resources that might be used to provide network services.

The network nodes 11 to which the end nodes 12 are connected are known as network node control points (NNCPs), and an end node 12 providing services to one or more Logical Unit (LU) resources is called an End Node Control Point (ENCP). The end nodes EN 189, EN 191 and EN 192 connected to an NNCP, and all of the other end nodes 12 connected through the access end nodes EN 189–192, directly or through a LAN, together with the NNCP network node with which they are connected itself, are together known as a topological "domain" in the sense that the NNCP provides directory and other network services for all of the resources in "its" domain. Thus, network node B.2, together with end node EN 189, ring LAN 13 and end nodes EN 1, 2, 3 and 4, form domain 15. Similarly, network node B.4, together with end node EN 191, ring LAN 14, end nodes EN 11–13, end node EN 192, the backbone LAN 18 including end nodes EN 8–10, form domain 16. Network node B.3, together with direct access end nodes 5, 6 and 7, form domain 17.

By convention, all of the network nodes 11 of WAN 10 have the same network identifier B (NETID) and this NETID precedes the identifiers of all of the network nodes (e.g., B.1 in network 10). These identifiers are all stored in a topology data base replicated in each of the network nodes 11 along with identifications and characteristics of the interconnecting links L1–5. In the prior art schemes, none of the end nodes 12 are in the WAN network 10 topology data bases. This lack is due to various reasons particular to the specific prior art embodiments. For example, it may be due to a desire to minimize the topology data base size for economic reasons or it may be because the values of these identifications are not known at the time the network 10 is created. Furthermore, it should be recalled that the network identifiers (NETIDs) of the end nodes 12 are not necessarily constrained to be the same as their network server node (NNCP) 11 and, indeed, are typically assigned independent of the creation of the WAN 10.

As noted, network nodes 11 are linked to others of the network nodes 11 by one or more communication links L1 through L5. Each such communication link may be a permanent connection or a selectively enabled (dial-up) connection, or any other kind of transmission facility, even including a portion of a LAN or a virtual LAN. Network nodes 11 each comprise a data processing system which provides data communications services to all connected nodes, network nodes and end nodes. The network nodes 11 each include one or more decision points within the node, at which point incoming data streams are selectively routed on one or more of the outgoing communication links, i.e., either to an end node attached to and/or served by that network node, or to another network node in network 10 via transmission links L1–L5. Such routing decisions are made in response to information in the header of the data packet. The network node also provides ancillary services such as the calculation of new routes or paths between end nodes, creation of the header, the provision of access control to packets entering the network at that node, and the provision of directory services and topology database maintenance in that node. The network nodes 11 also each can provide enhanced directory services for the domains of network 10 of FIG. 1, all in accordance with the present invention.

In order to transmit packets on the network of FIG. 1, it is necessary to calculate a feasible path or route through the network from the source entity to the destination identifier (server 139 of FIG. 8) entity to be used for the transmission of data streams. One optimal route calculating system is disclosed in H. Ahmadi et al. U.S. Pat. No. 5,233,604 granted Aug. 3, 1993. In prior art Wide Area Networks, the network information in the topology data bases is normally adequate to calculate such routes. If such a route can be calculated, a connection request message is launched on the network, from the source entity to the destination identifier (server 139) entity, explicitly identifying each entity along the route. Data packets may thereafter be transmitted along the calculated route from the originating node 121 to the destination identifier (server 139) node (and from the destination node 139 to the originating node) by placing this route in the header of the data packet. At the end of the transmission session, the process is reversed, taking down the connection. These functions are all well known in the prior and will not be described further.

Unfortunately, since the identifications of all of the end nodes 12 are not even in the topology data bases, such route calculations cannot be made in the large and compound network 10 of FIG. 1. In accordance with the present invention, the network node and end node and user resource information available in the prior art topology data bases of network 10 must be extended considerably to capture the extensive information concerning the domain resources, i.e., the end nodes, Local Area Networks, and the available end user resources. In further accordance with the present invention, the processes for acquiring, updating and using this extended topology information are known as enhanced central directory services and form the subject matter of this invention. The network node interior architecture necessary to support these operations are shown in FIG. 2.

In FIG. 2 there is shown a general block diagram of the generic network node architecture which might be found in all of the network nodes 11 of FIG. 1. The network node control circuits of FIG. 2 comprise a high speed packet switching fabric 33, such as a bus, onto which packets arriving at the node are entered. Such packets arrive over transmission links from other network nodes of the network, such as links L1–5 of FIG. 1, via transmission adapters 34, 35, and 36, respectively, or via transmission lines 200 or 201 and connected end nodes 30 and 31 from other networks (e.g., LANs). Packets can also be received over transmission line 202 from direct connect users i.e., link-adjacent nodes (EN 5–7) in FIG. 1. Note that the elements shown in FIG. 2 above the dashed line are not in the network 10 at all, but are located in the domains 15–17 of user facilities connected to the network nodes like that of FIG. 2. These connections in FIG. 2 are illustrative of the various resources shown in the network nodes 11 of the network 10 of FIG. 1.

Switching fabric 33, under the control of connection management facilities 44, connects each of the incoming data packets to the appropriate one of the outgoing transmission link adapters 34–36, or to the appropriate one of the LAN or direct access i.e., link adjacent end nodes 30, 31, 42, all in accordance with well known packet network operations. Moreover, network management control messages are also launched on, and received from, the network nodes 11 of network 10 (FIG. 1) in the same fashion as data packets. That is, each network packet, data packet or network management control message, transmitted across the network of FIG. 1, can be routed by way of switching fabric 33, as shown in FIG. 2. Connection management facilities 44 relies on the network topology information in network topology data base 45 to calculate packet routes, all as is well known in the prior art. In accordance with the present invention, and as previously discussed, large and complex compound WAN/LAN networks, such as that shown in FIG. 1, typically lack sufficient information in their topology data bases to manage these connections, specifically due to lack of end node location and connectivity information and LAN information which almost certainly would not fit into the topology data base 45. In accordance with the present invention, each network node in the network 10 of FIG. 1 may also include a central directory data base 43, controlled by a central directory server 37, to store additional information about all of the resources in the compound network of FIG. 1. Typically, however, only one of the network nodes in the WAN network acts as a central directory server at any one time. Also found in the generic network node of FIG. 2 is a domain directory data base 39 controlled by a domain directory server 38. The use of blocks 37, 38, 39 and 43 in a particular network node 11 of FIG. 1 depends directly on the services expected to be provided by that network node.

FIG. 3A is a graphical and functional flow chart of the directory services processes which can take place in the central directory services circuits and processes of the prior art. FIG. 3B is a corresponding graphical and functional flow chart of the enhanced directory services processes which can place in the enhanced directory services circuits and processes of the present invention. FIG. 3A will be taken up first.

In FIG. 3A, box 20 represents all of the various central directory services functions which might be performed by the prior art version of central directory server 37 of FIG. 2. These services include such things as the registration of new end node resources 23, 24 and 25 in the central directory data base 43 (FIG. 2), deletion or modification of these entries when appropriate, and searching and retrieving data base entries in response to requests from connection management facilities 44 of in any of the network nodes 21 and 22, corresponding to two of network nodes 11 of FIG. 1. The data base entries are then used to calculate new transmission routes between origin resources and destination identifier (server 139) resources, using the identifiers and possibly other resource characterization information.

Typically, it is desirable to register a newly added resource to the central directory in order to make its whereabouts (its resource identifier) available for future use by other entities in order to calculate routes or provide other services. In the prior art system of FIG. 3A, this is done as follows. Assume, for example, that Logical Unit (LU) resource 27, identified as "NETID3.LU1," is the newly added resource. A newly added resource can be attached to end node 25, as show in FIG. 3A, or may actually be contained inside of end node 25. In either event, when resource 27 is added to the network, functional interconnection 114 is used by end node server 25 to launch a REGISTER RESOURCE message, represented by arrow A, on interconnection 114 to its network node server 22, identified as "NETID1.NN2."

The REGISTER RESOURCE message A, to be described in more detail in connection with FIG. 6, includes information called "directory services control vectors," to be described in more detail in connection with FIG. 5, containing a three-part identification of the resource 27, including the identifier for the resource 27 itself (NETID3.LU1), the end node server 25 (NETID3.EN1), and the network node server 22 (NETID1.NN2) to which end node 25 is connected. These three identifiers are, of course, necessary to fully identify the resource 27 by identifying the particular network node server 22 serving the domain directory data base which can verify the existence of the resource 27. This resource information can also include ancillary data about the resource 27, in information formats called "tail vectors" attached to the REGISTER RESOURCE message. These tail vectors may, for example, comprise Quality of Service specifications which can be used to assist in the calculation of new routes. At registration time, of course, only the resource 27 identifier NETID3.LU1 and the end node identifier NETID3.EN1 are available at end node server 25 for the resource identifier triplet, and the network node identifier portion of the triplet is empty or absent at this time.

In response to the REGISTER RESOURCE message A of FIG. 3A, network node server 22 supplies its identifier (NETID1.NN2) as the third field of the resource 27 triplet identifier, stores the triplet is its own domain data base 39 (FIG. 2), and forwards a new REGISTER RESOURCE message B on to the central directory server 20 via functional connection 111. The contents of message B are used to store the resource identifier triplet in the central directory data base 43 (FIG. 2). This completes the central registration process.

Assume now that Logical Unit 26 wishes to establish a communications session with logical unit 27. End node server 23, which "owns" Logical Unit 26, forwards a LOCATE FIND (FIG. 6) message C on functional connection 112 to its owning network node server 21. Since network node server 21 does not have the requested resource identifier in its domain data base 39 (FIG. 2), network node server 21 checks its topology data base for the presence of a central directory server 20 in the network. Since central directory server 20 is present, server 21 forwards the LOCATE FIND message D on connection 110 to central directory server 20. If, for some reason, the central directory data base 43 (FIG. 2) of central directory server 20 does not contain the LU 27 identifier triplet, central directory server 20 would have to broadcast LOCATE FIND messages to all of the network nodes 11 of the entire network 10 of FIG. 1, a result to be avoided whenever possible.

Assuming that the requested resource (LU 27) identifier is present in the data base 43 (FIG. 2) of the central directory server 20, due to the pre-registration already described, server 20 launches a LOCATE FIND message E on connection 111 to network node server 22, which has been identified in the identifier triplet in the data base of server 20. Network node server 22, in turn, launches a LOCATE FIND message F on connection 114 to end node server 25, serving the sought resource 27. End node server 25 examines its own data base, confirms the existence of resource 27, and initiates a series of LOCATE FOUND messages G, H, and I, containing any "tail vectors" present in the local data base, back through connections 114, 111, and 110 to network node server 21 (the exact same route as the LOCATE FIND messages D, E and F). These tail vectors are not necessarily in the central directory data base, but may be necessary for route calculation by network node server 21. When returned to network node server 21, the connection management facilities 44 (FIG. 2) calculates the route (112-110-111-114) from LU 26 to LU 27, using the tail vectors to select the physical entities to embody this functional route. Network node server 21 then launches a LOCATE FOUND message J on connection 112 to end node server 23 to allow Logical Unit 26 to initiate a communication session on this route.

Note that, while all of the network nodes 11 of the network 10 of FIG. 1 are constrained by syntax convention to have an identical network identifier prefix (NETID1), the identifiers of end nodes 23, 24 and 25, and the Logical Unit resources 26 and 27 can have any arbitrary network identifier prefixes (NETID1, NETID2 and NETID3 in FIG. 3A). That is, end nodes of the network 10 of FIG. 1 can attach to other end nodes, to nodes of other networks, or to named multi-party connection facilities such as LANs (called "connection networks") without regard to the attaching entity's network identifier prefix. The freedom to connect to arbitrarily-named end node results in what are called "casual connections" in the prior art and is deemed to be necessary to allow a given end node to have a unique resource identifier and yet access any one or more different networks at different times, as may be needed. In effect, casual connections allow the creation of implicit network boundaries intersecting any internal link of an existing network that interconnects two nodes with different network identifiers. Although a Logical Unit may also have a different NETID from its owning end node, usually all of the resources attached to or contained in an end node have the same NETID.

All of the functions described in connection with FIG. 3A are available in the prior art. REGISTER RESOURCE and LOCATE FIND messages are allowed to traverse the links between standard network nodes and casually-connected standard end nodes. In accordance with the present invention, and as will be described in connection with FIG. 3B, the enhanced directory services of the invention uses this interconnection capability of the prior art to attach not only a single end node, but also an entire directory services domain (15, 16 or 17 of FIG. 1), not possible in the prior art. As will be apparent, this enhanced capability will allow all of the existing prior art directory services to be used efficiently not only with prior art networks connecting to foreign networks (different NETIDs), but also with the new, large, compound WAN/LAN networks, possibly APPN networks.

Referring more particularly to FIG. 3B, there is shown a graphical and functional flow chart of the enhanced directory services of the present invention. Note that FIG. 3B is identical to FIG. 3A in boxes 20, 21, 22, 23, 25, 26 and 27, and functional connections 110, 111, 112, 114, 116 and 117. That is, the enhanced processes of the present invention take advantage of and use all of the capabilities described in connection with FIG. 3A and already available in the prior art. Moreover, these capabilities are available from the prior art apparatus and processes, and require no directed network retrofitting. Indeed, the enhanced services of the present invention depend on the availability of these prior art services to extend the connectivity of network node servers to foreign networks, WAN or LAN, and permit efficient directory services even in large complex networks such as that illustrated in FIG. 1.

FIG. 3B differs from FIG. 3A only in the attachment of an entire network domain 300 to network node server 21 via functional connection 113. In accordance with the present invention, the contents of the resource triplet in the REGISTER RESOURCE messages launched in FIG. 3B are deliberately corrupted to make all of the resources contained in domain 300 appear to reside at the point of attachment, end node server 24. Because of this deception, all of the other entities in the network illustrated in FIG. 3B act as if any resource in domain 300 is at end node server 24. The prior art directory services in the network will therefore send REGISTER RESOURCE, LOCATE FIND, LOCATE FOUND, and all other messages intended for any resource in domain 300, to end node server 24. In accordance with the present invention, end node server 24 is equipped to relay these messages appropriately within domain 300. The ultimate result of this corruption of resource identifier triplets is to make the prior art central directory resource registration services in one network available in a different network. The prior art arrangements are simply not capable of providing this capability. As a measure of the value of this capability, this enhanced central resource registration can eliminate up to (n−1) * m directory services broadcast searches, where n is the number of network nodes in the entire network, and m is the number of resources to which connections are to be established. The efficiency of large, compound networks is enormously improved by this capability.

An appropriate corruption of resource identifier triplets can be accomplished in several ways. One preferred technique is as follows. Assume that resource 303, in domain 300, is the newly added resource. In accordance with one embodiment of the present invention, end node 302 creates a resource identifier triplet "NETID2.LU1-NETID2.EN3-[null]" (100c, 100b, 100a) for resource 303, leaving the network node control point portion of the triplet blank or empty since this information is not yet available. End node server 302 launches a REGISTER RESOURCE message A, routed onto ring LAN 13 and through connection 118, to reach end node 24 containing the partial resource identifier triplet. End node server 24 receives the REGISTER RESOURCE message A and stores the partial triplet identifier in its data base as the identifier of the added resource 303, along with any information necessary to route messages between resource 302 and end node server 24.

In accordance with the present invention, end node server 24 then deliberately corrupts the resource identifier triplet by placing its own identifier (NETID2.EN1) in the end node identifier field 100b of the resource identifier triplet for resource 303, replacing the NETID2.EN3 identifier previously there. End node server 24 then launches REGISTER RESOURCE message B on connection 113, containing the corrupted resource identifier triplet. Message B flows to network node server 21, which adds its identifier (NETID1.NN 1) in the heretofore empty portion 100c of the triplet identifier and stores this corrupt identifier triplet in its own local directory data base. Using only the prior art directory services, network node server 21 then launches a REGISTER RESOURCE message C on connection 110 to central directory services server 20, containing the corrupted resource identifier triplet. Since this corruption is undetectable to central server 20, or any other network nodes 11 of network 10, this corrupted identifier triplet becomes the centrally stored identifier for resource 303. The corrupted resource identifier can thereafter be used by the network processes to provide directory services to the network. All messages aimed at resource 303 will be sent to end node server 24 which is equipped to forward these messages to resource 303 itself, thus effectively extending these services to any or all resources in domain 300.

If the new resource is actually itself an End Node Control Point (ENCP) such as end node 302, the end node server 302 will launch a REGISTER RESOURCE message A identifying itself as the new resource (identifier=NETID2.EN3-NETID2.EN3-[null](100c, 100b, 100a)). Note the identical resource and owning end node identifiers. When end node server 24 receives this REGISTER RESOURCE message A, server 24 stores this triplet in its own end node data base, along with the routing information necessary to forward messages to end node server 302. End node server 24, as before, corrupts the resource triplet identifier by adding its own identifier (NETID2.EN1) in the end node (100b) portion of the triplet, previously "NETID2.EN3," and leaving the network node identifier portion empty or blank. Network node server 21 inserts its identifier NETID1.NN1 (100a), stores this corrupt triplet identifier in its own data base and launches REGISTER RESOURCE message C on functional connection 110, with the corrupt resource identifier triplet and any attached tail vectors, to central directory server 20. REGISTER RESOURCE message C is thereafter treated as any other registration message, taking advantage of all of the existing directory services facilities available in prior art server 20. All calls for resource 302 are directed to end node server 24 which, in turn, assures delivery to resource 302, all as described in connection with resource 303.

Still referring to FIG. 3B, if central data base server 20 thereafter receives a LOCATE FIND message such as from a network node for the identification of a desired destination resource previously registered to central directory server 20, the requested resource identification triplet identifier is retrieved from the central directory data base and used to forward a LOCATE FIND message back toward the destination network node identified in the stored triplet in order to confirm the identification in the central directory data base. As previously noted, the first encountered directory data base (network node 21 or network node 22 in FIG. 3B), replies to the LOCATE FIND message with a LOCATE FOUND confirmation message, based on the corrupt but matching resource identifier triplet in its own data base. This LOCATE FOUND message is then forwarded back to the originating network node requesting the found resource. The confirmed address can then be used by the requesting network node to compute physical routes between the originating resource and the desired destination identifier (server 139) resource.

The directory services flow chart of FIG. 3B can, of course, be used for many other directory services. An end node server 23, for example, may desire to locate resource 303 for the purpose of establishing a connection between LU 26 and resource 303. End node server 23 launches a LOCATE FIND message on functional connection 112 including a control vector identifying resource 303. As noted in connection with FIG. 3A, most searches (LOCATE FIND messages) require that the message be transmitted all of the way to the destination network node server or central directory server to retrieve the desired information. In accordance with APPN networks based on Baratz 4,914,571, the network node directory data bases contain all of the resource identifier triplets in their own domain. If the resource identifier sought by the LOCATE FIND message is present in the first encountered network node domain directory data base (network node server 21) due to previous registration, it can be used to confirm the identifier. That is, the corrupt but matching entry in the domain level directory data base is used to send a LOCATE FIND message for confirmation and tail vectors directly to the destination resource network node server, and the result placed in a LOCATE FOUND message returned to the requesting node without ever visiting central directory server 20.

In FIGS. 4, 5 and 6 there are shown graphical representations of generic General Data Stream (GDS) formats which implement the various messages which must be created and assembled in order to carry out the present invention. The GDS formats shown in FIGS. 4–6 are not, themselves, any part of this invention, and indeed, are disclosed in J. P Gray U.S. Pat. No. 4,914,571, granted Apr. 3, 1990. Only the prior art GDS formats which might be used to implement this invention are shown in FIGS. 4–6.

In FIG. 4, for example, there is shown a graphical representation of the generic GDS format, having fields 51, 52 and 53. Field 51 is used to store a byte-count representing the length of the variable 50, all as taught in the above-identified Gray reference. Similarly, field 52 contains an identifier of the type or kind of variable 50. Finally, field 53 contains the data to be transmitted in format 50, the operative management message information, or message information.

The generic GDS control vector format 54 at the bottom of FIG. 4 similarly includes three fields 55, 56 and 57. Field 55 contains the length of the control vector, field 56 contains a key identifying the kind of control vector, and field 57 contains the substantive control vectors information. Three control vectors used heavily in the present invention is the resource identifier triplet illustrated in FIG. 5.

In FIG. 5 there is shown a generic GDS format for the resource identifier triplets referred to in the above descriptions. Thus triplet 101 comprises three control vectors 100a, 100b and 100c. Each of vectors 100a–c, in turn, contains a control vector length field 58a–c, identifying the resource type as network node, end node, or user resource, respectively, a control vector key 59a–c, respectively, and information field 60a–c, respectively. The information fields 60a–c, of course, contain the three identifiers of the resource identification as previously described. Field 60a, for example, contains the identifier of the network node server serving that resource, field 60b contains the identifier for the end node server connected to or including that resource, and field 60c contains the identifier for the user resource itself. These identifiers form the triplet which will be used extensively in implementing the present invention, as will be described hereinafter.

In FIG. 6 there are shown prior art GDS formats for four messages which might be used to implement the present invention, as well as to implement the prior art directory services described with respect to FIG. 3A. The messages of FIG. 6 are not a comprehensive set which would be necessary to operate the network of FIG. 1, but only those necessary to provide the enhanced central directory services which form a part of the present invention. In FIG. 6, REGISTER RESOURCE message 61 is used to register resources as described above. In message 61, the first of three fields, field 62 contains a byte-count of the length of message 61. Field 63 of FIG. 5 contains the message identifier of message 61, and field 64 contains the necessary directory services resource vectors of FIG. 5. The three other messages of FIG. 6 (DELETE RESOURCE message 65, LOCATE FIND message 69, and LOCATE FOUND message 73) each includes fields similar to message 61, one difference being the message identifier fields 67, 71, and 75, each identifying the corresponding message. The message formats of FIG. 6 can also contain other fields taught by the prior art for other purposes not taught here, and which form no part of the present invention.

Figure 7:
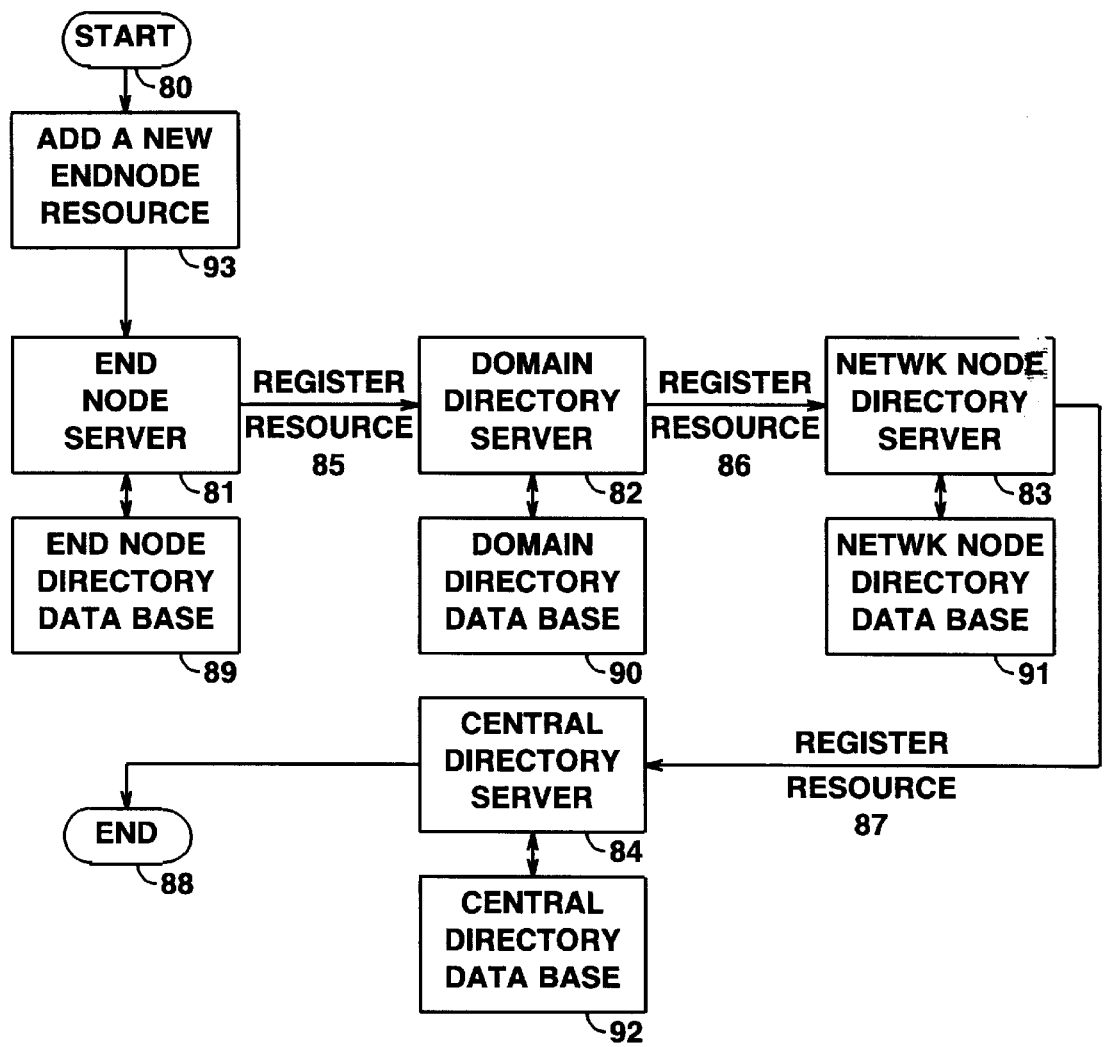
FIG. 7 shows a flow chart of the process used for initial end node resource registration which takes place at the addition of each new end node resource to the compound WAN/LAN network of FIG. 1, and forming part of the enhanced directory services in accordance with the present invention.

In FIG. 7, there is shown a formal flow chart of the process for registering resources found in different topology subnetworks (domains or LANs) in accordance with the present invention. In FIG. 7, box 80 represents the start of such a process for registering resources. The next box in FIG. 7, box 93, initiates the function of registering a new resource in the network 10 of FIG. 1. Box 81 is the end node server to which the new resource is attached or where the new resource resides. An end node directory data base 89 is connected to end node server 81 and is used to support the server 81 by storing resource identification triplets similar to those illustrated in FIG. 5.

When stimulated by the output of 93, end node server 81 launches a REGISTER RESOURCE message 85, identifying the new resource, to domain directory server 82. A domain directory data base 90 supports the server functions performed by server 82, including the storing resource identification triplets similar to FIG. 5. When message 85 reaches server 82, server 82 searches data base 90 for the resource identification triplet in the REGISTER RESOURCE message 85. If this resource identification in not found in data base 90, it is then registered in data base 90. In response to message 85 node 82 launches a new REGISTER RESOURCE message, modified in accordance with the present invention, containing the identifying triplet from message 85, to a network directory server 83, supported by network directory data base 91. Network server 83 can be a central directory network node, if directly connected to the domain server 83, or the first (or all) of the network nodes in the path to the central directory serving the network in which the central directory resides. In either case, the REGISTER RESOURCE message 86 or the REGISTER RESOURCE message 87 eventually arrives at the central directory server 84, supported by the central directory data base 92. If the resource identification contained in message 86 or message 87 is not already present in data base 92, it is now registered in data base 92. The cross network resource registration procedure of FIG. 7 then terminates in box 88. The central directory server 84 then can send a registration confirmation message launched back along the path of the REGISTER RESOURCE message confirming these registrations to the node initiating the RESISTER RESOURCE message.

In FIG. 8 there is shown a process like the process of FIG. 7 but used to locate resources already stored in the central directory data base. Starting at start box 120, box 124 is entered where, for example, a new physical route is to be calculated between two different resources in two different topology domains of the network of FIG. 1, an originating resource and a destination resource. The originating resource of the desired route, specified by box 124, is connected to or included in originating end node associated with end node server box 121. That is, the origin source address supplied by box 121 includes the address of end node server 121. Box 121 first inspects its local data base 129 for the address of the destination identifier resource supplied by box 124. Not finding the destination identifier in data base 129, box 121 launches a LOCATE FIND message 125 (message 69, FIG. 6) containing the identifier of the destination in a control vector (like vector 54 of FIG. 4), but absent the other two destination vectors of the destination triplet identifier. Note that originating resource triplet identifiers can be used in the network of FIG. 1 for other purposes than routing. For example, such triplet identifiers can also be used for user access control, not disclosed here and no part of the present invention, but forming part of the prior art.

When LOCATE FIND message 125 reaches domain directory server 122, server 122 inspects its domain directory data base 130, looking for the destination identifier triplet. If the destination resource address triplet is found in data base 130, and the destination resource is in server 122's domain, domain directory server will send a LOCATE FOUND message 178 back to end node server 121 without consulting any other nodes. Assuming that the destination identifier resource address triplet is not found in data base 130, however, domain server 122 corrupts the received origin resource identifier triplet by substituting its own identifier in place of the identifier of the real owning end node control point, corresponding to end node server 121 of FIG. 8. Domain directory server 122 then caches the corrupted origin identifier triplet in data base 130 and forwards a new LOCATE FIND message 126 to the next adjacent network node directory server 123, including the corrupted origin identifier triplet and the incomplete destination triplet. The network node associated with network node server 123 may itself contain the central directory services data base for all of network 10 (FIG. 1), or network node server 123 may simply be in the first network node on the route to the central directory services node. In FIG. 8, the latter architecture is assumed, where the route to the centralized directory (server 133) is only a single network node away, i.e., the node corresponding to directory server 123.

Network node server 123 likewise inspects its own data base 128, looking for the destination resource address triplet. Were this destination address triplet to be found in data base 128, and if the triplet indicated that the destination resided in network node server 123's domain network node server 123 would use this address triplet to launch LOCATE FOUND message 177 back to domain directory server 122 which, in turn, would update its data base 122 and launch a LOCATE FOUND message 178 back to end node server 121 to complete the search confirmation. Assuming that the destination resource address triplet is not found in data base 128, network node directory server 123 inserts its own identifier vector into the network node portion of the origin resource identifier triplet. Server 123 then caches this now completed but corrupted origin resource identifier triplet in its own data base 123 (to permit the satisfaction of subsequent new resource searches) and launches a LOCATE FIND message 127 to central directory server 133, possibly traversing other intermediate network nodes as described above.

At central directory server 133, central directory data base 134 is examined for the destination resource identifier triplet. If this entry is not found in central directory data base 134, central directory server 133 would be required to conduct a broadcast search for the missing resource identifier, and, if not found, return a LOCATE NOT FOUND message which would terminate the route selection procedure. In this broadcast search, a reply from any central directory server terminates searches at all other nodes, thus terminating the broadcast search. This process is not illustrated in FIG. 8 since the process is very similar to a successful search.

Assume, however, that central directory data base 134 already contains the destination resource identifier triplet, due to a previous resource registration completed by FIG. 7. The destination resource identifier triplet found in data base 134 is corrupted in accordance with the present invention and as described in connection with FIG. 7, identifying domain directory server 137, connected to network node directory server 135, instead of the destination resource's true address at destination node server 139 (end node 81). In response to the complete but corrupted destination triplet, central directory server 133 updates central directory data base 134 with the origin identifier triplet from the LOCATE FIND message 127. Server 133 then launches LOCATE FIND message 131, containing the completed but corrupted origin identifier triplets to network node directory server 135. When LOCATE FIND message 131 reaches network node server 135, server 135 queries its data base 136 for the destination resource identifier. Finding the destination resource identifier in data base 136 due to a previous registration process, server 135 stores the corrupted origin triplet in data base 136 and then consults the instructions in data base 136 concerning identifier verifications. If the LOCATE FIND messages 125, 126, 127 and 131 contain a "Verification Required" flag, or if destination server 137 had previously provided an "Always Search Me" flag in data base 136, server 135 launches a LOCATE FIND message 132 to domain directory server 137.

When LOCATE FIND message 132 reaches server 137, server 137 consults memory 138 for the destination resource identifier triplet. This identifier triplet is found due to its previous registration. Included with this identifier triplet, of course, is the routing information indicating that the destination resource is not actually connected to or included in server 137, and the routing information necessary to actually reach end node server 139, where the destination resource actually does reside. Domain server 137 also consults its own data base 138 to see if a verification search must be forwarded to the actual destination end node server 139. If so, domain directory server 137 forwards LOCATE FIND message 140 to end node server 139 which, in turn, consults its data base 141, confirms the presence of the destination resource, and launches LOCATE FOUND message 173 back to domain server 137. Whether destination end node verification is required or not, domain server 137 launches a LOCATE FOUND message 174 back to network node server 135. Server 135 relays the LOCATE FOUND as message 175 back along the path traversed by the LOCATE FIND messages 125, 126, 127, and 131 in the form of LOCATE FOUND messages 175, 176, 177 and 178, respectively. Each server along the way (133, 123 122 and 121) stores the verified destination resource identifier triplet in its respective data base. Recall that destination domain server 137 has substituted its own address for that of destination server 139, so that all of the data bases in the system have the same complete but corrupted destination resource identifier triplet. This ensures that all future searches will get the proper value regardless of which data base is used to satisfy the search.

When LOCATE FOUND message 176 reaches network node server 123, server 123 is able to use the verified destination address triplet and the verified origin address triplet, along with tail vectors obtained by the search and other data stored in its copy 181 of the network topology data base (45 in FIG. 2), to compute the route from the apparent (but corrupted) origin resource to the apparent (but corrupted) destination resource. The apparent (but corrupted) resource locations include all of the connectivity information necessary to actually complete the physical route. The apparent origin server may also include Quality of Service requirements which must be observed for each leg of the, calculated physical route. When the physical route is fully calculated in server 123, server 123 returns the LOCATE FOUND message 177, together with the newly computed physical route, to server 122 and thence, via LOCATE FOUND message 178, to end node server 121. This verified physical route is delivered to box 180 where this physical route is used, by way of a connection request message, to initiate communication sessions with the destination resource attached to server 139. This route can, of course, be modified, immediately or in the future, and used for various purposes for reasons present in the prior art and forming no part of the present invention. The process of FIG. 8 terminates in end box 142.

The processes illustrated in detail in FIGS. 7 and 8, and in a general way in FIG. 3, can be implemented by special purpose circuits designed to perform all of the functions described with respect to the various directory servers. Since it is normally faster and less expensive to program these processes on a computer, the preferred embodiment of this invention is believed to be such programmed implementations. The writing of these programs by an experienced network function programmer is believed to be obvious in view the figures of this application together with the above extremely detailed description of those figures. In addition, other detailed implementations of the general principles of this invention are likewise believed to be obvious to the programmer of ordinary skill. The GDS format of the various messages describe herein are only illustrative and other formats, suitable for other networks, could readily be used by a programmer of ordinary skill without departing from the spirit and scope of this invention.

What is claimed is:

1. In a first network of native nodes and links, said first network having central directory services capable of serving directly connected user resources in said first network but not capable of serving user resources connected to said first network by way of other foreign networks, each of said foreign networks characterized by having a different network identifier than said native nodes of said first network, a system for providing said directory services for said other foreign networks within said first network, comprising:

means for connecting any selected one of said foreign networks to said first network through a particular attaching node of said foreign network and a particular network node of said first network; and means for automatically registering each of one or more new user resources added to said selected one of said other foreign networks in a centralized directory data base in said first network, using said particular attaching node as a single access point from said first network for said new resource in said other foreign network, wherein said means for automatically registering uses pre-existing registration messages and further comprises:

means for using a pre-existing three-part identifier in said pre-existing messages to identify each of said new resources being registered, wherein a pre-existing format of said three-part identifier comprises; (i) a first part comprising an identifier of a selected one of a plurality of network nodes of said first network, said selected one being said particular network node through which said foreign network containing said new resource is connected to said first network; (ii) a second part comprising an identifier of an owning node containing or directly attached to said new resource; and (iii) a third part comprising an identifier of said new resource.

2. The system for providing directory services according to claim 1, wherein said foreign network comprises an Advanced Peer-to Peer Networking network.

3. The system for providing directory services according to claim 1, wherein said first part, said second part, and said third part are formatted in a Generalized Data Stream (GDS) format.

4. The system according to claim 1, further comprising means in said particular attaching node for routing messages directed to a destination resource located in said foreign network, comprising:

means for receiving a message directed to said destination resource located in said foreign network;

means for determining said owning node of said destination resource; and means for forwarding said message to said owning node for delivery to said destination resource.

5. The method according to claim 1, wherein said means for automatically registering further comprises:

means for launching said registration message from said owning node when said new resource is added to said foreign network, wherein said owning node inserts said second part and said third part;

means in said particular attaching node for corrupting said three-part identifier of said new resource when said launched registration message is received at said attaching node, wherein said corruption comprises replacing said second part with an identifier of said particular attaching node, creating a modified registration message;

means in said particular attaching node for launching said modified registration message to said particular network node;

means in said particular network node, responsive to receiving said modified registration message, for inserting said identifier of said particular network node in said first part of said three-part identifier, creating a completed three-part identifier;

means in said particular network node, responsive to said means for inserting, for storing said completed three-part identifier in a local directory database of said particular network node means in said particular network node, responsive to said means for inserting, for forwarding said modified registration message with said completed three-part identifier to a central directory server of said first network; and means in said central directory server, responsive to receiving said forwarded message, for storing said completed three-part identifier from said forwarded message as a central directory identifier of said new resource.

6. The system according to claim 5, further comprising:

means for using said stored completed three-part identifier as a destination address for sending data to a destination resource in said foreign network; and means for determining, within said attaching node, an actual path to use for routing said sent data to said destination resource.

7. The system according to claim 5, wherein a result of said means for storing said completed three-part identifier in said central directory server is to make said new resource appear to be directly attached to, or located within, said particular attaching node.

8. The system according to claim 1, further comprising:

means for using pre-existing registration mechanisms for creating said three-part identifier for said new resource, wherein said owning node and said new resource are identified by said second and third parts; and means for corrupting said second part of said created said three-part identifier, substituting an identifier of said particular attaching node for said identifier of said owning node.

9. In a first network of native nodes and links, said first network having central directory services capable of serving directly connected user resources in said first network but not capable of serving user resources connected to said first network by way of other foreign networks, each of said foreign networks characterized by having a different network identifier than said native nodes of said first network, a method for providing said directory services for said other foreign networks within said first network, comprising the steps of:

connecting any selected one of said foreign networks to said first network through a particular attaching node of said foreign network and a particular network node of said first network; and automatically registering each of one or more new user resources added to said selected one of said other foreign networks in a centralized directory data base in said first network, using said particular attaching node as a single access point in said first network to access said new resource in said other foreign network, wherein said automatically registering step uses pre-existing registration messages and further comprises the step of:

using a pre-existing three-part identifier in said pre-existing messages to identify each of said new resources being registered, wherein a pre-existing format of said three-part identifier comprises; (i) a first part comprising an identifier of a selected one of a plurality of network nodes of said first network, said selected one being said particular network node through which said foreign network containing said new resource is connected to said first network; (ii) a second part comprising an identifier of an owning node containing or directly attached to said new resource; and (iii) a third part comprising an identifier of said new resource.

10. The method for providing directory services according to claim 9, wherein said foreign network comprises an Advanced Peer-to Peer Networking network.

11. The method for providing directory services according to claim 9, wherein said first part, said second part, and said third part are formatted in a Generalized Data Stream (GDS) format.

12. The method according to claim 9, further comprising the step of routing, in said particular attaching node, messages directed to a destination resource located in to said foreign network, comprising the steps of:

receiving a message directed to said specific destination resource located in said foreign network;

determining said owning node of said destination resource; and forwarding said message to said owning node for delivery to said destination resource.

13. The method according to claim 9, further comprising the steps of:

using pre-existing registration mechanisms for creating said three-part identifier for said new resource, wherein said owning node and said new resource are identified by said second and third parts; and corrupting said second part of said created said three-part identifier, subtituting an identifier of said particular attaching node for said identifier of said owning node.

14. The method according to claim 6, wherein said means for automatically registering further comprises the steps of:

launching said registration message from said owning node when said new resource is added to said foreign network, wherein said owning node inserts said second part and said third part;

corrupting, in said particular attaching node, said three-part identifier of said new resource when said launched registration message is received at said attaching node, wherein said corrupting step comprises replacing said second part with an identifier of said particular attaching node, creating a modified registration message;

launching said modified registration message from said particular attaching node to said particular network node;

inserting, by said particular network node, responsive to receiving said modified registration message, said identifier of said particular network node in said first part of said three-part identifier, creating a completed three-part identifier;

storing in said particular network node, responsive to said inserting step, said completed three-part identifier in a local directory database of said particular network node forwarding from said particular network node, responsive to said inserting step, said modified registration message with said completed three-part identifier to a central directory server of said first network; and storing in said central directory server, responsive to receiving said forwarded message, said completed three-part identifier from said forwarded message as a central directory identifier of said new resource.

15. The method according to claim 14, further comprising the steps of:

using said stored completed three-part identifier as a destination address for sending data to a destination resource in said foreign network; and determining, within said attaching node, an actual path to use for routing said sent data to said destination resource.

16. The method according to claim 14, wherein a result of said storing of said completed three-part identifier in said local directory database and said storing in said central directory server is to make said new resource appear to be directly attached to, or contained within, said particular attaching node.

17. A system for providing enhanced directory services in a compound network comprised of one or more wide-area networks and one or more local-area networks, said system comprising;

centralized means in said compound network for storing three part identifications of a plurality of resources in said compound network, wherein said three parts comprise, for a particular one of said resources; (i) a third part comprising an identification of said particular resource; (ii) a second part comprising an identification of an owning node to which said particular resource is connected; and (iii) a first part comprising an identification of a network node through which said owning node is reachable; and means for automatically and deliberately registering, in said centralized means for storing, a corrupted version of said three part identifications for each new resource added to said compound network, further comprising;

means for creating said corrupted version by substituting an identification of an attaching node for said second part, wherein said attaching node is connected to said network node identified by said first part, thereby causing said new resource to be reachable through, and to appear to be directly connected to, said attaching node.

18. The system according to claim 17, further comprising:

means for utilizing pre-existing resource registration mechanisms of said compound network to store each of said corrupted versions; and means for using said stored corrupted versions as destination addresses for said added new resources.

19. The system according to claim 17, wherein said compound network comprises an Advanced Peer-to Peer Networking network.

20. The system according to claim 17, wherein each of said first part, second part, and third part of said three part identifications is formatted in a Generalized Data Stream format.

21. A method for providing enhanced directory services in a compound network comprised of one or more wide-area networks and one or more local-area networks, said method comprising the steps of;

storing three part identifications of a plurality of resources in said compound network in a centralized store, wherein said three parts comprise, for a particular one of said resources; (i) a third part comprising an identification of said particular resource; (ii) a second part comprising an identification of an owning node to which said particular resource is connected; and (iii) a first part comprising an identification of a network node through which said owning node is reachable; and automatically and deliberately registering, in said centralized store, a corrupted version of said three part identifications for each new resource added to said compound network, further comprising;

creating said corrupted version by substituting an identification of an attaching node for said second part, wherein said attaching node is connected to said network node identified by said first part, thereby causing said new resource to be reachable through, and to appear to be directly connected to, said attaching node.

22. The method according to claim 16, further comprising the steps of;

utilizing pre-existing resource registration mechanisms of said compound network to store each of said corrupted versions; and using said stored corrupted versions as destination addresses for said added new resources.

23. The method according to claim 21, wherein said compound network comprises an Advanced Peer-to Peer Networking network.

24. The method according to claim 21, wherein each of said first part, second part, and third part of said three part identifications is formatted in a Generalized Data Stream format.

25. The system according to claim 17, wherein said new resource may be an end node resource or a user resource.

26. The method according to claim 21, wherein said new resource may be an end node resource or a user resource.

* * * * *